No. 707,138. Patented Aug. 19, 1902.
B. F. MAYO & A. D. ELLIOTT.
NAIL ASSORTING MECHANISM.
(Application filed Apr. 28, 1902.)
(No Model.) 10 Sheets—Sheet 2.

Fig. 3.

No. 707,138. Patented Aug. 19, 1902.
B. F. MAYO & A. D. ELLIOTT.
NAIL ASSORTING MECHANISM.
(Application filed Apr. 28, 1902.)

(No Model.) 10 Sheets—Sheet 3.

Fig. 4.

Witnesses: Inventors.

No. 707,138. Patented Aug. 19, 1902.
B. F. MAYO & A. D. ELLIOTT.
NAIL ASSORTING MECHANISM.
(Application filed Apr. 28, 1902.)

(No Model.) 10 Sheets—Sheet 4.

Fig. 5.

Witnesses:
Fred S. Greenleaf.
W. C. Lunsford.

Inventors
Benjamin F. Mayo.
Alvin D. Elliott.
by Crosby & Gregory
Attys.

No. 707,138. Patented Aug. 19, 1902.
B. F. MAYO & A. D. ELLIOTT.
NAIL ASSORTING MECHANISM.
(Application filed Apr. 28, 1902.)

(No Model.) 10 Sheets—Sheet 5.

Fig. 6.

Witnesses:
Fred S. Greenleaf
W. C. Lunsford

Inventors.
Benjamin F. Mayo.
Alvin D. Elliott.
By Crosby Gregory.
Attys.

No. 707,138. Patented Aug. 19, 1902.
B. F. MAYO & A. D. ELLIOTT
NAIL ASSORTING MECHANISM.
(Application filed Apr. 28, 1902.)

(No Model.) 10 Sheets—Sheet 6.

No. 707,138. Patented Aug. 19, 1902.
B. F. MAYO & A. D. ELLIOTT.
NAIL ASSORTING MECHANISM.
(Application filed Apr. 28, 1902.)

(No Model.) 10 Sheets—Sheet 7.

Witnesses:
Fred L. Grunlof.
N. C. Lunsford.

Inventors:
Benjamin F. Mayo,
Alvin D. Elliott.
by Crosby Gregory.
Attys.

No. 707,138. Patented Aug. 19, 1902.
B. F. MAYO & A. D. ELLIOTT.
NAIL ASSORTING MECHANISM.
(Application filed Apr. 28, 1902.)

(No Model.) 10 Sheets—Sheet 8.

Witnesses:
Fred S. Greenleaf.
N. C. Lunsford.

Inventors.
Benjamin F. Mayo,
Alvin D. Elliott.
By Crosby Gregory.
Attys.

No. 707,138. Patented Aug. 19, 1902.
B. F. MAYO & A. D. ELLIOTT.
NAIL ASSORTING MECHANISM.
(Application filed Apr. 28, 1902.)

(No Model.) 10 Sheets—Sheet 9.

UNITED STATES PATENT OFFICE.

BENJAMIN F. MAYO, OF SALEM, AND ALVIN D. ELLIOTT, OF WINCHESTER, MASSACHUSETTS, ASSIGNORS TO UNITED SHOE MACHINERY COMPANY, OF PATERSON, NEW JERSEY, AND BOSTON, MASSACHUSETTS, A CORPORATION OF NEW JERSEY.

NAIL-ASSORTING MECHANISM.

SPECIFICATION forming part of Letters Patent No. 707,138, dated August 19, 1902.

Application filed April 28, 1902. Serial No. 104,979. (No model.)

*To all whom it may concern:*

Be it known that we, BENJAMIN F. MAYO, residing at Salem, county of Essex, and ALVIN D. ELLIOTT, residing at Winchester, county of Middlesex, State of Massachusetts, citizens of the United States, have invented an Improvement in Nail-Assorting Mechanism, of which the following description, in connection with the accompanying drawings, is a specification, like characters on the drawings representing like parts.

This invention relates to mechanisms for assorting nails, and particularly to that type of such mechanisms in which nails are received at the upper end of an inclined raceway with their heads and points arranged indiscriminately, from which raceway the nails are delivered all pointing the same way. These mechanisms have generally been used in connection with machines for attaching heels; but the application of the present invention is of course not limited to such use. In mechanisms of this type it has been customary to have spaces between the grooves which receive and convey the nails in order that nails improperly lodged on the raceway might be discharged through those spaces before reaching the device at the end of the raceway for delivering the nails. It has also been customary to use a returning-table to receive the nails so discharged from the raceway.

In nail-assorting mechanisms in general use it has been the practice to incline the raceway to facilitate the travel of nails on the raceway toward the delivering mechanisms. It has also been the practice to incline the returning-table in the opposite direction in order that the nails rejected by the raceway may be carried back by the returning-table to the source of supply. It is also customary in these mechanisms to reciprocate both the raceway and the returning-table, the jolting given the nails by these reciprocations causing a forward movement of the nails on the raceway and the returning-table. It has been attempted to reciprocate the entire nail-assorting mechanism as a whole; but this resulted in very injurious jarring of both the assorting mechanism and the heeling-machine. An important feature of the present invention consists in mechanism for reciprocating the raceway and the returning-table in opposite directions, preferably at the same time. By this arrangement the momentum of the raceway is offset by the momentum of the returning-table and the jarring and wear of the machine caused by these reciprocations are reduced to a minimum.

Another feature of our invention consists in a magazine having a series of shelves to receive and lift the nails in bulk and deliver them as desired. This magazine is arranged to scatter the nails upon a bridge, which is shown as carried by the raceway and as comprising a series of projections with spaces between them, said bridge spanning the upper end of the raceway. The raceway presents a series of grooves side by side and so located with relation to the spaces between the projections of the bridge that nails scattered upon the bridge may drop through the spaces therein and enter the grooves in the raceway. The projections of the bridge extend into the magazine for a short distance to receive a portion of the nails from the magazine, while the upper end of the raceway is extended farther into the magazine than the bridge, so that a portion of the nails may drop directly thereon.

Other features of invention will be hereinafter more fully described and claimed at the end of this specification.

Referring to the drawings, A represents a portion of the frame of a heel-nailing machine, which preferably is of the class shown and described in United States Letters Patent No. 694,656.

Figure 1:
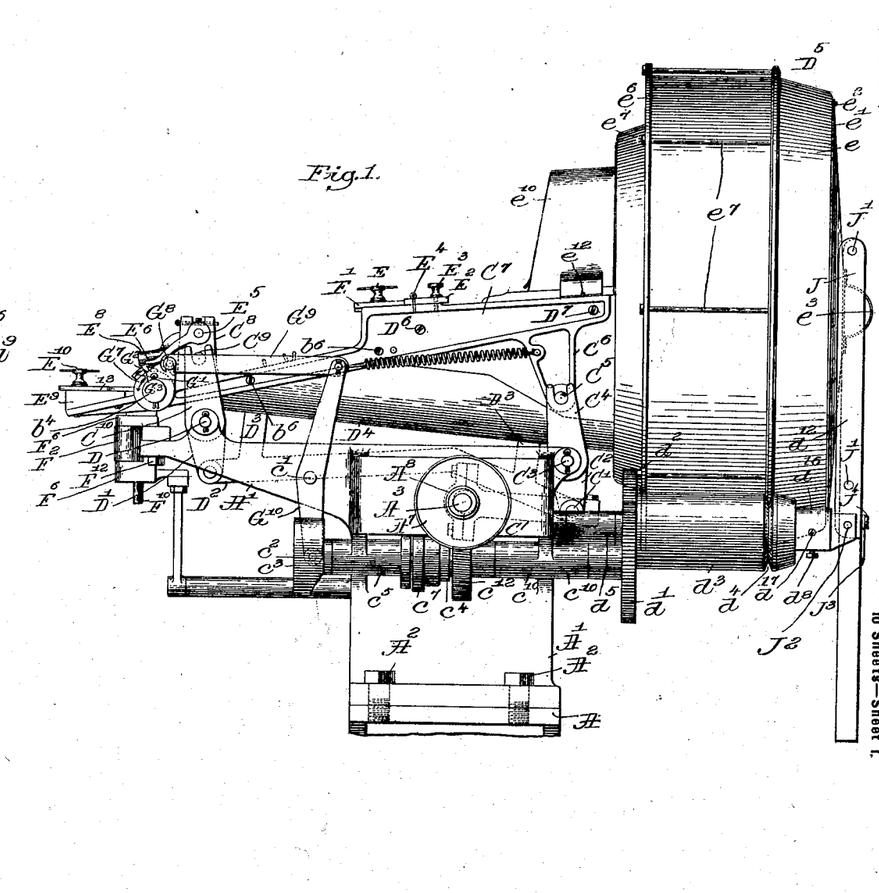
Figure 1 of the drawings, in side elevation, shows our invention in one of the best forms now known to us.
Figure 2:
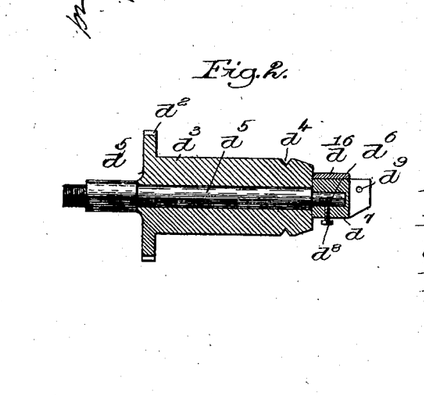
Fig. 2 is a section showing one of the rollers for supporting and rotating the magazine.
Figure 5:
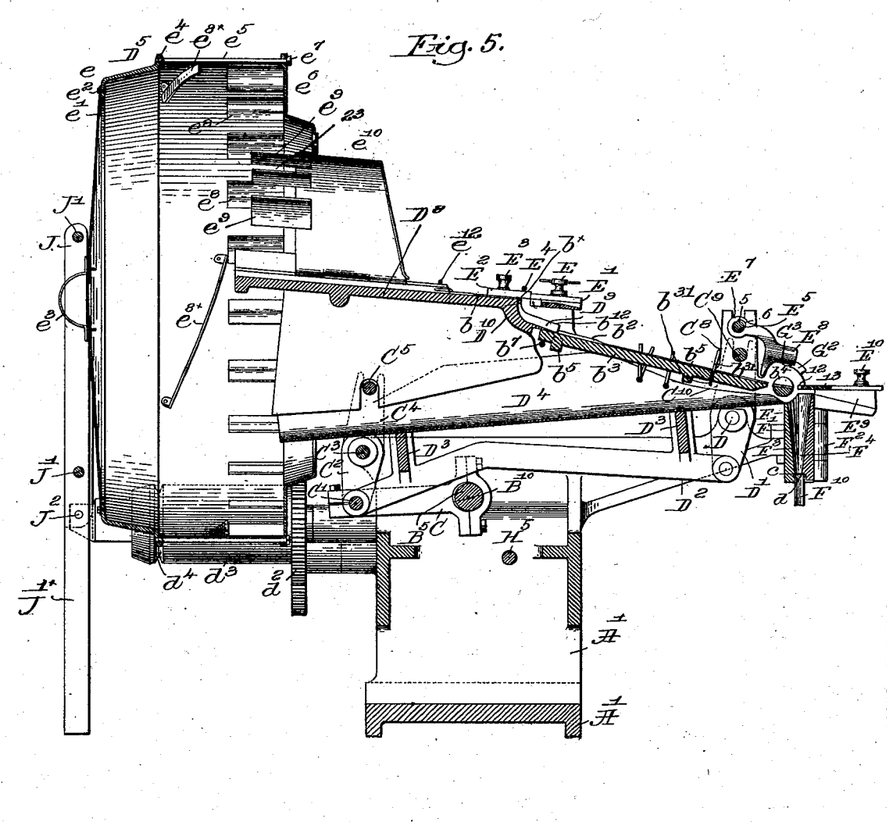
Fig. 5 is a longitudinal section on the line $x$, Fig. 4.
Figure 11:
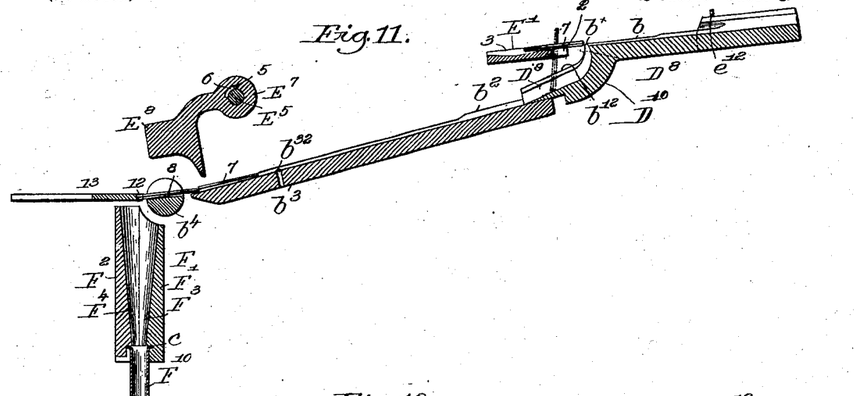
Figs. 11 and 12 are sectional details of the raceway and discharging device on the dotted line $y$, Fig. 8, showing how the nails are controlled and discharged, the nail-stops being shown in section.
Figures 22, 23, 24, 25, 26, 27, 28, 29:
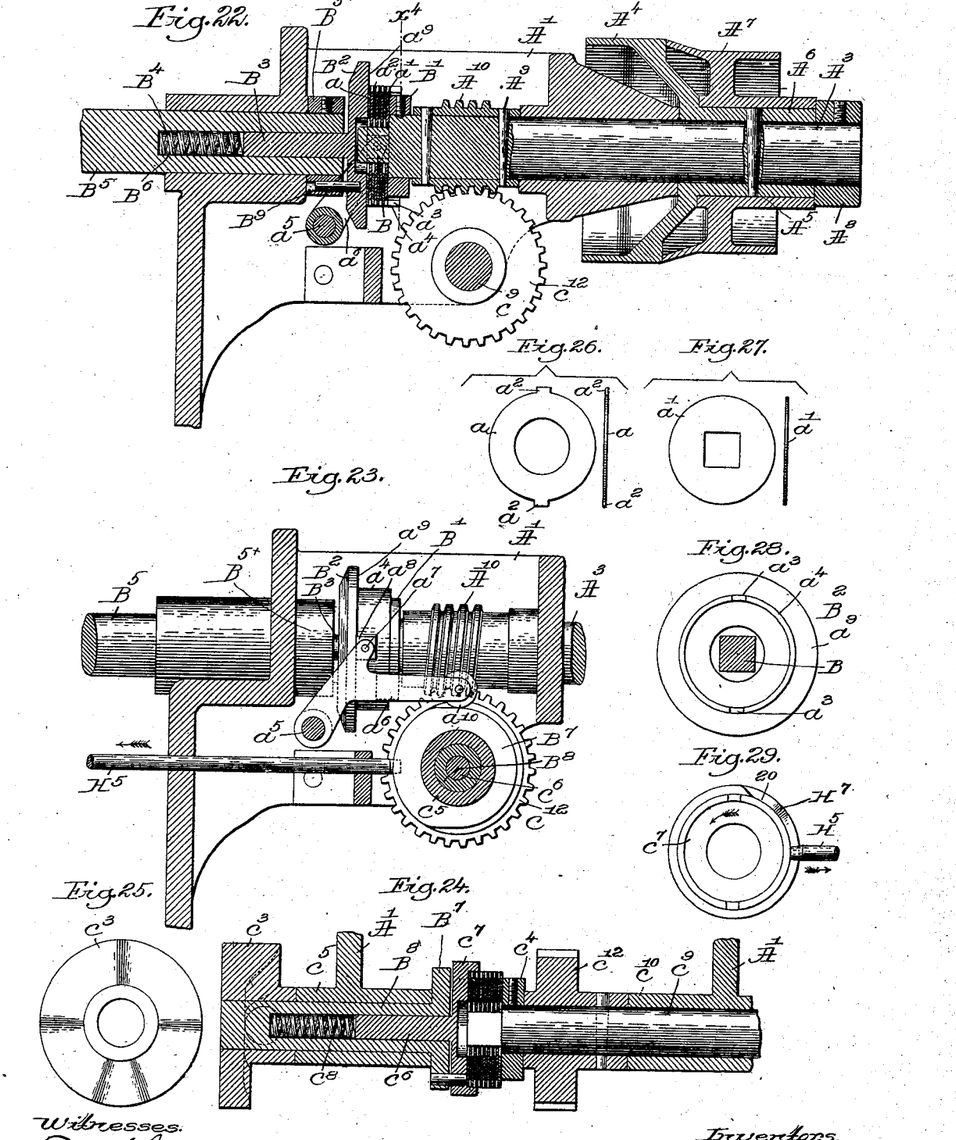
Fig. 22 is a sectional detail in the line $x'$, Fig. 3.
Fig. 23 is a side elevation of some of the parts shown in Fig. 22.
Fig. 24 is a longitudinal section of the shaft in the line $x^2$, Fig. 3.
Fig. 25 is a face view of the cam for operating the nail-discharging means.
Figs. 26 and 27 show the plates forming part of the clutch to be described, said plates being shown in face and edge view.
Fig. 28 is a view to the left of the line $x^4$, Fig. 22, showing the disk with the clutch-plates removed and the tenon in section.
Fig. 29 is a face view of the disk $c^7$, (see Fig. 24,) carried by stem $c^6$, and the rod or device coacting therewith for controlling the times of starting and stopping the shaft $B^8$, which controls the delivery of nails to the chutes.

The portion A of the frame sustains the frame $A'$ of the nail-assorting mechanism and is secured in place by screws $A^2$. The frame $A'$ sustains suitable bearings for a main shaft $A^3$, provided with a fast pulley $A^4$, secured to said shaft by a pin $A^5$, entering a sleeve $A^6$, extending from one side of said pulley, said sleeve receiving upon it the loose pulley $A^7$, the loose pulley being retained on said sleeve by a collar $A^8$. The shaft $A^3$ has secured to it by pins $A^9$ a worm $A^{10}$, and the end of said shaft has a tenon B, near which is fixed to said shaft a collar $B'$. The shaft $A^3$ is connected by a clutch to the shaft $B^5$. The clutch comprises a disk $B^2$, provided with a stem $B^3$, which is received in the socketed end of the shaft $B^5$. Said disk is also connected to said shaft $B^5$ by a pin $B^9$, arranged to slide in a recess in a collar $B^{5\times}$, secured to the shaft $B^5$. A spring $B^4$ acts to normally press the disk $B^2$ toward the collar $B'$ on the shaft $A^3$. The disk $B^2$ is provided on the side adjacent the collar $B'$ with a flange $a^4$, adapted to receive within it the friction-disks $a$ $a'$ of the clutch. The disks $a$ have circular apertures at their centers to permit the tenon B to rotate freely therein, and they have peripheral tangs $a^2$, which are adapted to be received within recesses or notches $a^3$ in the flange $a^4$ of the disk $B^2$, and thereby cause said disk $B^2$ and the shaft $B^5$ to rotate when said disks are rotated. The disks $a'$ have rectangular central apertures fitting the tenon B and adapting said disks to be rotated by and with the continuously-rotating main shaft $A^3$. The disks are applied alternately to the tenon B and, together with said tenon, are received within the flange $a^4$ of the disk $B^2$, all as shown in Fig. 22. The collar $B'$ acts against one side of the accumulated disks, while the disk $B^2$ is adapted to be pressed by the spring $B^4$ against the other side to hold the disks in frictional contact and cause said disks and the shafts $A^3$ and $B^5$ with which they are connected to be rotated together. The shaft $B^5$ actuates the means for reciprocating the raceway. The raceway comprises a lower section constituted by a plurality of bars $b^3$, secured together by cross-bars $b^5$ and grooved on their upper surfaces, an upper section $D^8$, and an intermediate connecting-section $D^{10}$. The upper and intermediate sections are shown as integral. The upper section is conveniently formed as a plate or casting grooved, as at $b$, said section having pins $e^{12}$ to cause the nails which drop thereon to arrange themselves longitudinally thereof and to direct the nails in their movement along the said raceway-section. Near the lower end of the section $D^8$ the wall between the grooves $b$ is cut away to form channels $b^{10}$, through which will fall all the nails which are not properly arranged in the groove $b$. The intermediate section $D^{10}$ overlaps the upper ends of the bars $b^3$ of the lower section. The section $D^{10}$ presents abrupt shoulders $b^\times$ and is provided with grooves or channels $D^9$. These grooves or channels are cut into the section so as to extend slightly under or back of the shoulder $b^\times$, as shown in Fig. 11, whereby a nail may fall from the position shown in full lines in said Fig. 11 to the position shown in dotted lines without danger of its head striking the bottom of the groove $D^9$ before it has fallen sufficiently far to insure that it shall be reversed. The grooves $b$ $D^9$ $b^2$ present a continuous pathway for those nails which have become properly arranged in the upper raceway-section. The raceway-sections are attached to the supporting-frame $C^7$ by fastening means, shown as screws $b^6$ entering the cross-bars $b^5$ of the lower section, and by bolts $D^6$, $D^7$, and $b^7$, as shown in Figs. 1 and 5.

Whenever the endmost series of nails at the lower end of the raceway is to be discharged, the reciprocating movement of the raceway is stopped temporarily by stopping the rotation of the shaft $B^5$. The mechanism for stopping the rotation of the shaft $B^5$ is as follows: The frame is provided with a suitable pivot-stud $a^5$, supporting a lever $a^6$, having a pin $a^7$, on which is mounted loosely a block $a^8$, one edge of the block contacting with the face $a^9$ of the disk $B^2$, and this lever is provided at its opposite end, as herein shown, with a roller $a^{10}$, which is acted upon by a cam $B^7$, carried by a shaft $B^8$, the cam being of such shape as to move the lever $a^6$ and cause it to move the disk $B^2$ against the action of the spring $B^4$ and temporarily disengage the shaft $B^5$ from the main shaft $A^3$.

The shaft $B^5$ is provided with cranks or eccentrics $B^{10}$, (see Fig. 5,) which are embraced by links C, said links at their opposite ends embracing rods C', (see Figs. 1 and 5,) carried by arms $C^2$, connected with the rock-shaft $C^3$, having upwardly-extended arms $C^4$, which embrace shafts or studs $C^5$, extended beyond ears or legs $C^6$ of the frame $C^7$. The rear end of said frame $C^7$ is herein represented as sustained by the shafts or studs $C^5$, resting in notches of the arms $C^4$, the lower end of said frame having, as herein shown, suitable stands, as $C^8$, provided with studs $C^9$, which enter notches in upright arms $C^{10}$, pivoted upon a shaft D, sustained in an extension of the frame A'. The shaft D has depending arms D', which are jointed in suitable manner by a link $D^2$ with the rods C', before described, so that in the rotation of the shaft $B^5$, having the cranks or eccentrics $B^{10}$, the arms $C^4$ and $C^8$ are vibrated in unison, thus moving the raceway back and forth rapidly, and thereby causing the nails on the raceway to travel downwardly toward the delivery end of the raceway. The links $D^2$ at opposite sides of the machine are connected by like cross-bars $D^3$, (see Figs. 3 and 5,) and said cross-bars have secured to them a nail-returning table $D^4$, which is therefore reciprocated simultaneously with the raceway, but in an opposite direction. The table $D^4$ is inclined downwardly and backwardly from at or near the delivery end of the raceway, so that nails escaping through spaces $b^{10}$ or from the raceway-grooves and dropping through the spaces $b'$ between the bars $b^3$ of the lower raceway-section may fall on said returning-table and be returned to the magazine $D^5$, to be described.

It will be understood from the above description that the raceway and the returning-table $D^4$ are simultaneously reciprocated in opposite directions by the eccentrics $B^{10}$. The movement is applied directly to the returning-table $D^4$ and indirectly to the raceway through the rock-shaft $C^5$, as is clear from Fig. 6. The advantage of this arrangement is that the reciprocations of the raceway and the returning-table neutralize each other and obviate the excessive vibration of the machine, which is an objectionable feature of prior mechanisms in which reciprocating raceways have been employed.

Figure 8:
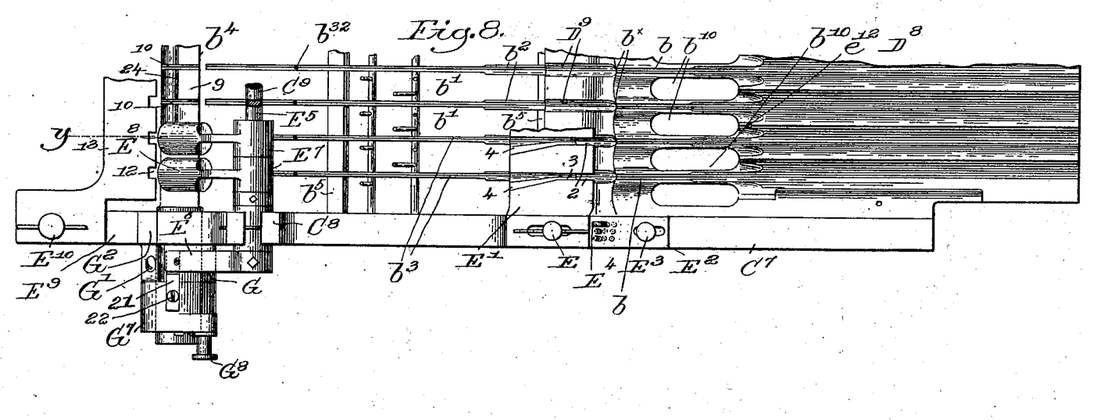
Fig. 8 is an enlarged detail plan of parts of the raceway.

Upon the top edge of the frame $C^7$ we have adjustably connected by a screw E a reversing-plate E' to receive and support the points of nails which come down point first. It has a series of grooves 3 at its upper edge (see Figs. 8 and 12) and a series of slots 2, which are in line with the grooves $b$. The bottoms of the portions of said grooves 3 nearest the slots 2 are in substantially the same inclined plane as the bottoms of the grooves $b$, and toward the lower edge of said plate said grooves 3 are deflected and deepened, as at 4, Fig. 8, to thus provide a runway for the discharge of long or imperfect nails through the spaces $b'$ between the raceway-bars $b^3$ onto the nail-returning table $D^4$. The reversing-plate E' is adjustable toward and from the shoulders $b^\times$ referred to to provide for nails varying in length, and in order that the distance may be gaged properly for each particular length of nail we have provided the frame $C^7$ with a gage $E^2$, slotted, as represented in Figs. 1 and 8, to receive the shank of an adjusting clamp-screw $E^3$, the said plate having a series of holes in which may be placed a cotter-pin $E^4$, thereby to locate the plate E', Figs. 1 and 8, in exactly the proper position to enable the machine to operate with a nail of any desired length.

Figure 9:
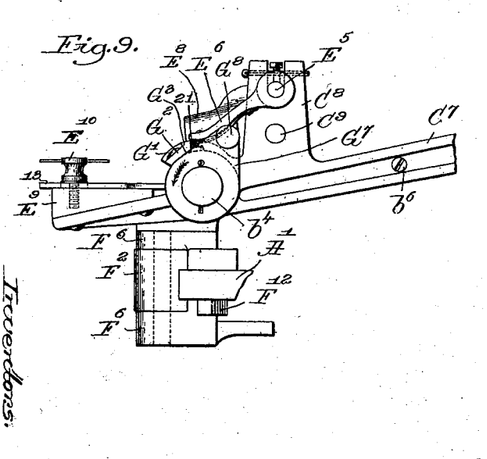
Figs. 9 and 10 show two details in side elevation of the lower end of the raceway, the parts shown occupying different positions.
Figure 10:
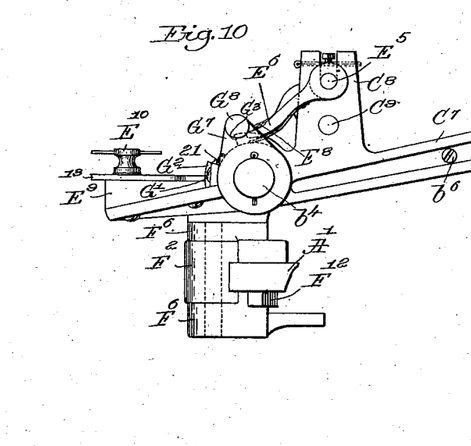
Figure 14:
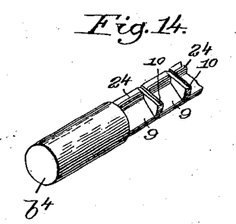
Fig. 14 is a detail showing a part of the nail-discharging means detached.
Figure 15:
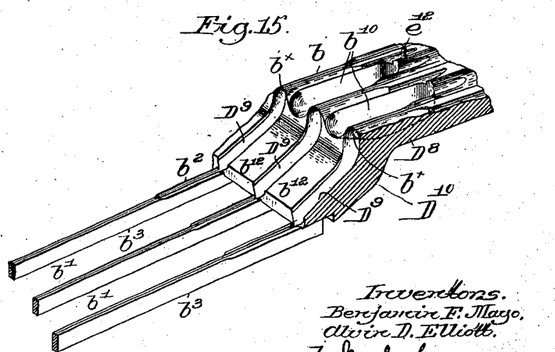
Fig. 15 is a detail showing parts of the intermediate portion of the raceway.

The stands $C^8$ at opposite sides of the lower end of the frame $C^7$ receive a rock-shaft $E^5$, (see Figs. 1, 8, and 9,) provided at one end with an arm $E^6$, secured thereto, and this rock-shaft is provided (see Figs. 11 and 12) with a series of studs 5, which enter notches 6, cut inside the bosses $E^7$ of a series of nail-stops $E^8$, one for each bar $b^3$. Said stops are normally upheld, as in Fig. 11, by the contact of the pins 5 with one end of each slot 6; but just as a series of nails which have come onto the discharging device $b^4$ are to be discharged therefrom the rock-shaft $E^5$ is turned from its normal position, Figs. 11 and 9, letting the stops drop by gravity and meet the series of nails 7 next back from the series of nails 8, resting on the discharging device and to be discharged, said stops positively detaining the series of nails 7 and all back of them on the raceway while the series 8 is being delivered. The discharging device $b^4$ is herein represented as a rod (see Figs. 11, 12, and 14) cut away, as at 9, at suitable intervals to leave uprights or projections 10, which are grooved to receive and sustain nails leaving the ends of the raceway-bars $b^3$, the leading ends of said nails coming onto said discharging device entering notches 12 in an adjustable stop-plate 13, held in position on a block $E^9$ by a clamp-screw $E^{10}$. The spaces 9 between the uprights 10 of the discharging device are blocked at one edge by stops 24. The ends of these stops are beveled, and the stops are shown as slightly higher than the projection containing the grooves 10, so that any sliver or imperfect nails lodged with a perfect nail in a groove 10 will meet one end of a stop and will be arrested thereby and prevented from entering the chute.

Figures 12, 13:
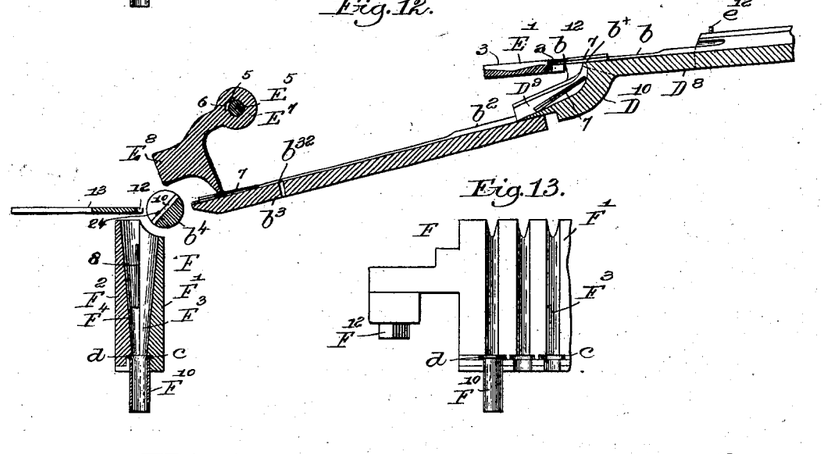
Fig. 13 is a detail showing part of the rear bar of the tube-holder.

As best shown in Figs. 11 and 12, we have located below the discharging device $b^4$ a chute F, having a series of tapering passages into which are delivered the nails discharged from the discharging device. For the best results this chute is composed of a stationary bar F' and a movable bar F², each of said bars having made in it at suitable intervals slots, as F³ and F⁴, connecting with the grooves of the raceway.

Figure 3:
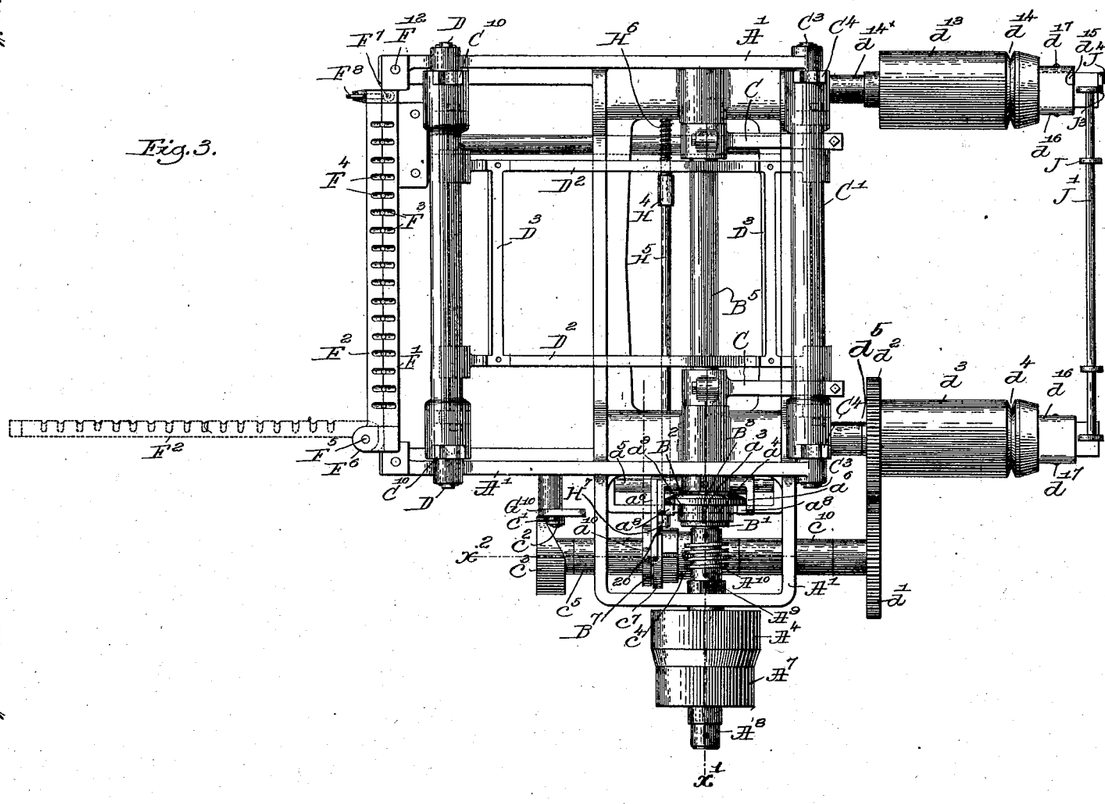
Fig. 3 is a plan view with the magazine and raceway omitted and the tube-holding bar shown open in dotted lines.
Figure 4:
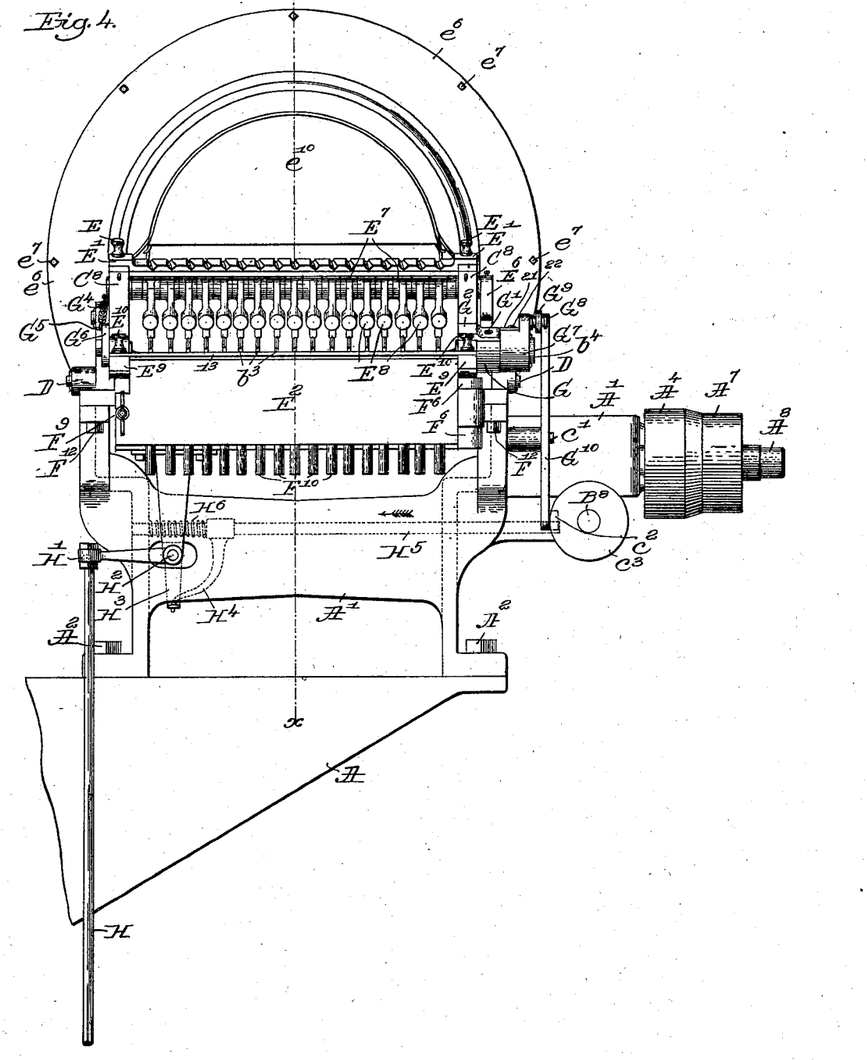
Fig. 4 is a front end elevation of the parts shown in Fig. 1.

In the construction shown in Figs. 1 to 16 the movable bar F² (see Fig. 3) is pivoted upon a stud F⁵, extended through ears F⁶ of the stationary bar F', which at or near its opposite end has pivotally mounted upon it at F⁷ a locking device, represented as a piece of metal threaded at one end and provided with a thumb-nut F⁸, the end of the movable bar F² being notched at F⁹ (see Fig. 4) to enable the locking device to be swung about its pivot F⁷ after relaxing the thumb-nut F⁸ in order that the movable part F² of the bar may be swung aside, as shown in Fig. 3.

The advantage of making the chute F in two parts is that it can be readily opened to remove any obstructions that may have accumulated. Another advantage is that the two parts of the chute form a convenient means for clamping in place the short tubes F¹⁰, which constitute the upper end portions of the tubes for conducting the nails to the heel-attaching machine. The upper ends of these tubes F¹⁰ (see Figs. 11 and 12) are represented as flanged, and the stationary part F' is grooved at $c$ to receive said flange, a suitable notch in the movable part F² at the lower end of the groove F⁴ receiving a part of said flange.

When the number of nails required in a series is less than the number of raceway-grooves, the feed of nails from the extra grooves may be stopped by inserting stop-pins $b^{31}$ in holes $b^{32}$ in such grooves or by any other suitable means.

The discharging device $b^4$ (see Fig. 14) has fixed upon one end of it (see Figs. 4 and 8) a collar G, having secured to it by a set-screw G' a stop G². The stop G² is normally held pressed against a shoulder G³ by means of a spring G⁴, (see Fig. 6,) connected at one end to one of said stands and at its other end with a stud G⁵, carried by an arm G⁶, suitably secured to the opposite end of the discharging device $b^4$ outside the frame C⁷. The shoulder G³ forms part of the frame and is extended forward from the stand C⁸. The spring and stop determine the normal position of the discharging device and maintain it as represented in Fig. 11.

To operate the discharging device to discharge the nails deposited upon it, we have in this instance of our invention provided the following means, viz: We have applied loosely to one end of the discharging device $b^4$ (see Figs. 1 and 8) an arm G⁷, having a crank-pin G⁸, which is embraced by a link G⁹, jointed to the upper end of a lever G¹⁰, pivoted at $c'$ upon the frame A' and provided at its lower end, as represented by dotted lines in Fig. 1, with a roller $c^2$, which acts against the face of the cam $c^3$, (see Figs. 2 and 24,) fast upon a shaft B⁸, having as its bearing $c^5$ a portion of the frame A', said shaft being bored and receiving the stem $c^6$ of a disk $c^7$, substantially like the disk B², hereinbefore described. The end of the shank $c^6$ is acted upon by a strong spring $c^8$, which tends to press the friction-plates shown in Fig. 24 into engagement, so that the shaft B⁸ and the cam $c^3$ will be rotated from the shaft $c^9$, having its bearing $c^{10}$ in a portion of the frame A'. Said shaft $c^9$ has fixed upon it a worm-toothed gear $c^{12}$, which is engaged by the worm A¹⁰, hereinbefore described, and rotates said shafts $c^9$ and B⁸ in unison, except when the clutch, which comprises the disk $c^7$, friction-plates, and the collar $c^4$, fixed to the shaft $c^9$, is separated, so that $c^9$ may run and not rotate the shaft B⁸. The shaft B⁸ (see Fig. 24) is rotated only at such time as the nails on the discharging device are to be delivered to the chute, and at this same time the motion of the shaft B⁵ is arrested. The clutch parts uniting the shafts B⁸ and $c^9$ are held disengaged by rod H⁵, as hereinafter explained, except when the cam $c^3$ is to be rotated once to actuate the discharging device. Let it be supposed that the nail-discharging mechanism herein referred to is being used in connection with a heel-nailing machine such as represented in said Letters Patent No. 694,656, dated March 4, 1902. Whenever the nail-carrier shown in said patent is to be provided with nails, it will be swung by the operator into nail-receiving position, and in coming into such position a device carried or moved by the carrier will raise a rod H. (See Fig. 4.) The upper end of the rod H engages an arm H' and turns a rock-shaft H², causing the second arm H³ of said rock-shaft, which latter is in engagement with an arm H⁴ of a rod H⁵, to move said rod H⁵ in the direction of the arrow adjacent thereto in Figs. 4 and 29, thus withdrawing the beveled end of said rod from the cam projection H⁷ on the disk $c^7$ of the clutch above referred to. The withdrawal of said rod enables the spring $c^8$ to cause the shaft B⁸ to be clutched with the shaft $c^9$, so as to be rotated by it. As the shaft B⁸ is started the disk $c^7$ is rotated in the direction of the arrow on it in Fig. 29, and the end of the rod H⁵ rides on the face of the disk. As the disk rotates the depressed portion 20 thereof arrives opposite the end of the rod H⁵, whereupon the said rod is pushed into said depressed portion by the spring H⁶, and the cam H⁷ is then permitted to act against the said rod H⁵, which is laterally immovable, thus pushing the disk $c^7$ to the left, Fig. 24, compressing the spring $c^8$ and releasing the clutch, and leaving the shaft B⁸ at rest until such time as the operator shall again desire to discharge a series of nails, when the rod H⁵ will be moved, as stated, to repeat the operation. When the lever G¹⁰ is moved by the cam $c^3$, the link G⁹ turns the arm G⁷ in the direction of the arrow on it, Figs. 1 and 9, into the position Fig. 10, thus turning the discharging device $b^4$ from the position Fig. 11 into the position Fig. 12, and the nails leave said discharging device head first, as therein represented, and enter the grooves in the chute F. During this movement of the arm $G^7$ a projection 21, (see Figs. 8, 9, and 10,) connected with the arm $G^7$ by a screw 22, retires from below the end of the arm $E^6$, thus enabling the stops $E^8$ to drop by gravity and meet the nails 7 lying at the ends of the raceway, and thereafter the projection 21 meets the projection $G^2$ and turns the discharging device $b^4$. There is thus provided for the arm $G^7$ a sufficient amount of lost motion to enable the stops $E^8$ to meet and secure the nails next back of those to be delivered by the discharging device before the discharging device is started to deliver its nails. The shaft $c^9$ is provided at one end with a pinion $d'$, (see Figs. 3 and 7,) which engages a pinion $d^2$, fast upon a magazine-actuator $d^3$, shown as a roller having a groove $d^4$, said roller being mounted on and so as to turn freely about a stud $d^5$. (Shown best in Fig. 2.) The front end of the roller rests against a shoulder on the stud $d^5$, and the rear end of the stud has a reduced portion $d^6$, which receives a bearing $d^7$, connected therewith by a set-screw $d^8$. The bearing $d^7$ has a hole $d^9$, which receives a pin $J^2$, constituting a pivot for a magazine-supporting frame, which normally, as in Figs. 1 and 7, maintains the magazine in its operative position, but which when in the position shown in full lines in Fig. 6 sustains the magazine so that nails may be poured into it or enables the magazine to be taken off from the frame and the nails therein emptied for the reception of nails of a different length. A second magazine-supporting roller $d^{13}$ is mounted upon a stud $d^{14 \times}$, having applied to its end a bearing $d^{15}$, like the bearing $d^7$ described. The bearings $d^7$ and $d^{15}$ are covered, as shown in Figs. 1 and 7, by a pad $d^{16}$, which may be of leather, held in place by screws $d^{17}$, the pad obviating jamming of the flange of the magazine in its rotation.

Figure 16:
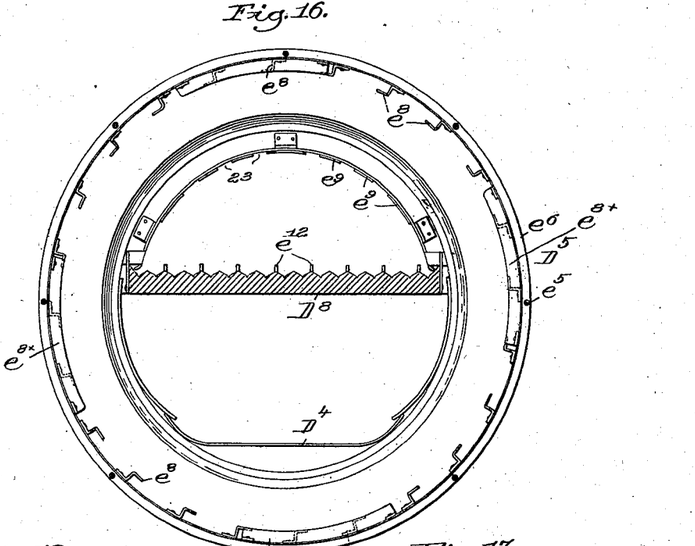
Fig. 16 is a cross-section of the raceway near its upper end looking into the magazine.

The magazine $D^5$ is circular and preferably made of sheet metal and is composed, as represented, of a curved plate $e$, closed at one end with a plate $e'$. The plate $e'$ is secured to the plate $e$ by screws $e^2$ and has a cover $e'^{\times}$, provided with a handpiece $e^3$. The plate $e$ has an outwardly-turned portion $e^4$, which enters the grooves $d^4$ in the actuator $d^3$ and supporting-roller $d^{13}$. The magazine comprises also a cylindrical portion $e^5$ and a face $e^6$, said cylindrical portion and face being united to the portion $e$ by bolts $e^7$, and the circular portion $e^5$ sustains within it a series of nail-lifting shelves $e^8$, the shape of which is best shown in Fig. 16. Said shelves pick up the nails thrown in them in bulk and carry the nails with the magazine in its rotation. The nails drop from the shelves and fall upon a bridge $e^9$, herein represented as sustained upon an arch $e^{10}$, spanning or crossing the upper portion $D^8$ of the raceway. The arch $e^{10}$ is held in position by pins $e^{12 \times}$. (See Fig. 6.) The shelves $e^8$ of the magazine are shorter than the width of the portion $e^5$, as shown in Fig. 5, and the space in the rear of the shelves is provided with a plurality of feeders $e^{8 \times}$, shown as bars arranged diagonally in said space. This construction permits of a large quantity of nails being loaded into the magazine at a time, while the short nail-lifting shelves will engage and raise only a portion of such quantity of nails as the magazine rotates. When the quantity of nails in the magazine has become small, the feeders $e^{8 \times}$ serve to work said nails gradually over onto the side of the magazine which is provided with the shelves to cause the said magazine still to supply a sufficient quantity of nails to the raceway. The bridge $e^9$ is slotted at intervals or so constructed as to present a series of projections with spaces 23 between, so that nails discharged by the magazine on the bridge will slide thereon and drop through the spaces 23 upon the upper portion of the raceway. The object of this bridge is to assist in distributing the nails uniformly across the raceway in order to keep all the grooves supplied.

Figure 6:
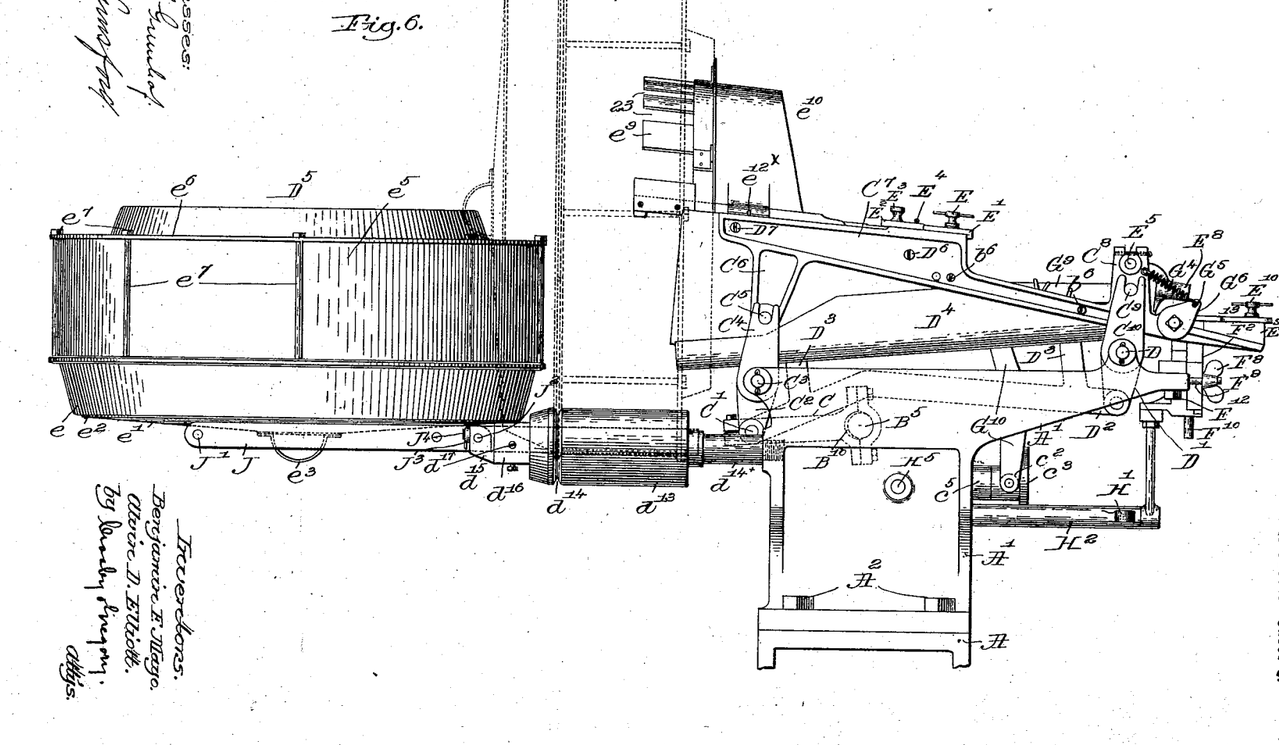
Fig. 6 shows a left-hand side elevation of the machine with the magazine tipped over to be filled.
Figure 7:
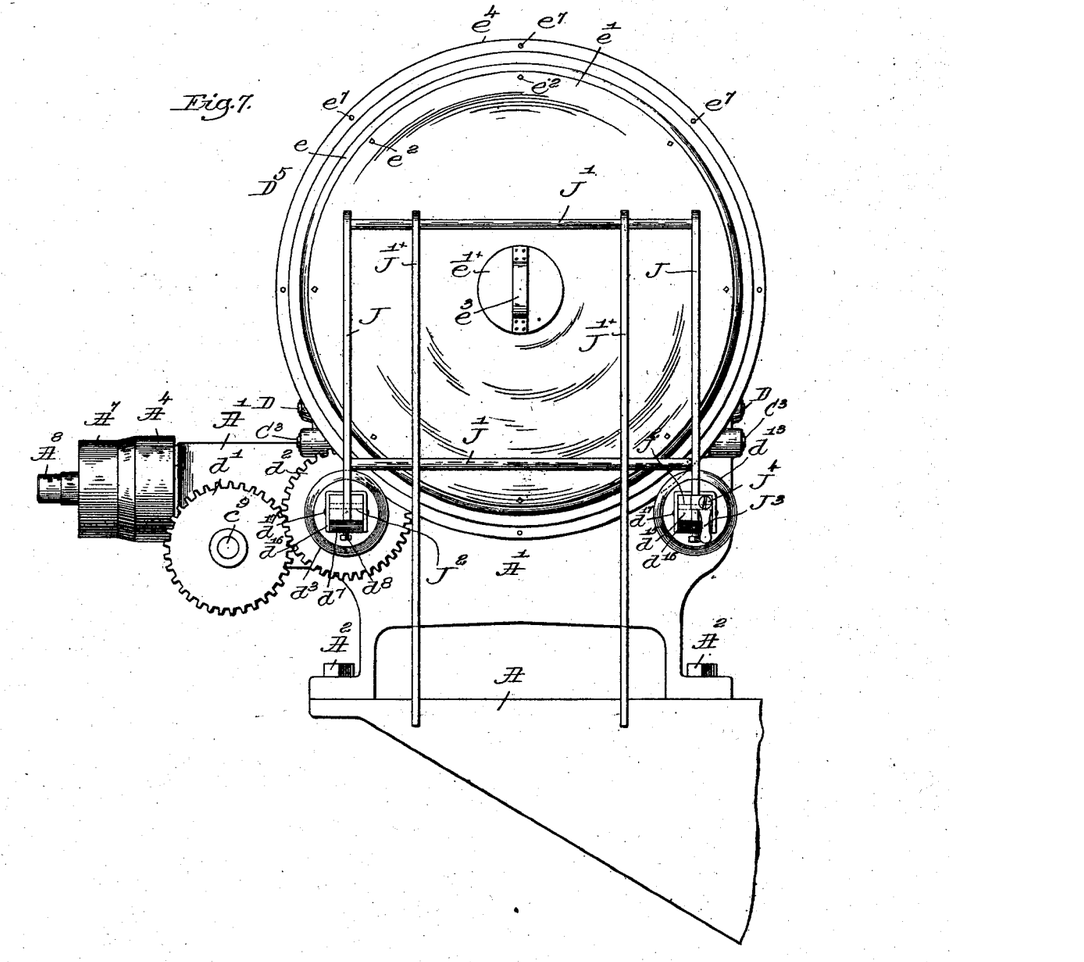
Fig. 7 is a rear end elevation.

The magazine-supporting frame as shown in Fig. 7, comprises upright bars J J and $J'^{\times} J'^{\times}$, connected by cross-bars $J' J'$. The bars J J are pivotally connected to the bearings $d^7 d^{15}$, while the bars $J'^{\times} J'^{\times}$ are extended below such pivotal connection and are adapted when the frame is turned to the horizontal position (shown in Fig. 6) to contact with the lower side of the magazine and raise it sufficiently to remove the flange $e^4$ of the magazine from the grooves $d^4$ of the supports $d^3$ and $d^{13}$. The ends of the bars J J adjacent the pivots $J^2$ are provided with square shoulders on the lower side and rounded shoulders on the upper side, as shown in Fig. 6, said square shoulders being adapted to abut against the ends of the bearings $d^7$ and $d^{15}$ to thereby support said frame in the horizontal position. The frame may be locked in its upright position by a locking device $J^3$, shown in Figs. 1 and 7 as a latch having an arm adapted to be turned into position in the rear of one of the bars J.

In operation let it be supposed that the magazine has been supplied with nails of the proper length and the belt has been put upon the fast pulley $A^4$ to start the shafts $A^3$ and $c^9$. This done, the shaft $B^5$ is rotated, thereby reciprocating the raceway endwise and rotating the magazine, causing the shelves of the magazine to lift nails and discharge them upon the bridge, the nails passing through the spaces 23 of the bridge and falling upon the upper portion of the raceway, some of the nails entering each one of the grooves $b$, either head or point first indiscriminately.

Nails lodged in the grooves $b$ are moved downwardly therein by the reciprocating movements of the raceway, and, viewing Fig. 11, any nails coming down the raceway-grooves $b$ point first cross the space between the reversing device E' and the shoulder $b^\times$ and have their points supported on the reverser E', as represented in Fig. 11. As soon as the head of one of such nails passes the shoulder $b^\times$, the weight of the head of the nail preponderating, the nail tips, so that it falls through the slot 2 immediately under it in the reversing device and enters the groove $D^9$ head first, the nail then passing on into the groove $b^2$. All nails passing along the grooves $b$ head first drop through the space 2 without being arrested by the reverser and enter the grooves $D^9$, (see Fig. 12,) passing therefrom into the grooves $b^2$ head first, so that all the nails coming into the grooves of the bars $b^3$, constituting the lower portion of the raceway, have their points arranged in the same direction. Normally the discharging device $b^4$ and the stops $E^8$ occupy the positions shown in Fig. 11, so that the nails have free course down the grooves $b^2$, the lowermost series of the nails in said grooves entering the grooves 10 of said discharging device, the nails being arrested by the stop 13. The nails on the discharging device are discharged only at the time that the operator may require the nails to be delivered into a nail-carrier or other device, and whenever the rod $H^5$ is retracted by the movement of the carrier, as explained, or otherwise the shaft $B^8$ is started, so that the discharging mechanism may be actuated to supply nails. The first movement of said shaft $B^8$ unclutches, as described, the clutch $B^2$, stopping temporarily the movement of the shaft $B^5$ and arresting the reciprocating movements of the raceway and nail-returning table, and at this same time the stops $E^8$ are permitted to descend upon a series of nails 7, as shown in Fig. 12, and the discharging device is thereafter actuated by this one rotation of the shaft $B^8$ and its cam $c^3$, and the nails 8 thereon are discharged into the chute F.

Figure 17:
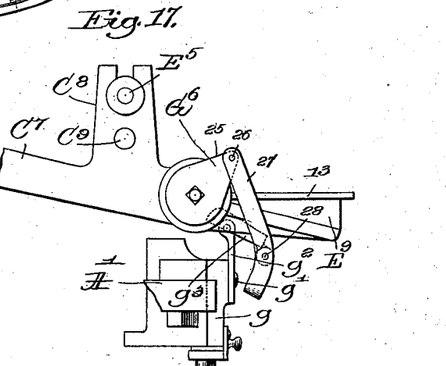
Figs. 17 and 18 show two views of like parts, representing a modified form of nail-discharging means, the parts in said views occupying different positions.
Figure 18:
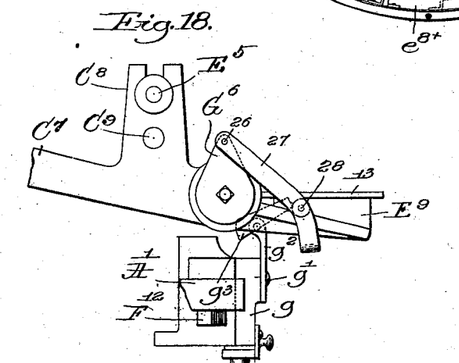
Figures 19, 20, 21:
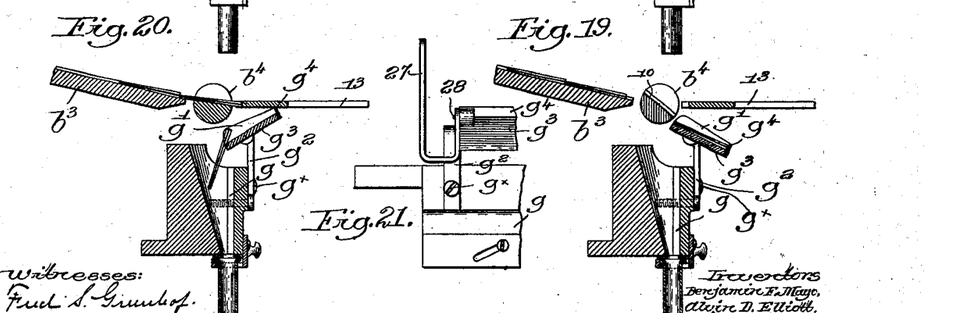
Figs. 19 and 20 are sectional details of Figs. 17 and 18.
Fig. 21 is a detail of parts of the devices shown in Fig. 19.

In case it is desired that the nails shall be discharged from the assorting mechanism point first instead of head first we will detach from the frame A' of the machine the chute F and substitute therefor a chute having attached thereto a reversing device, which is shown in Figs. 17, 18, 19, 20, and 21. In said figures, $g$ indicates the chute, which may be of any usual construction. Attached to the side thereof by screws $g^\times$ are supporting-arms $g^2$, upon which is pivoted a reversing-plate $g^3$, provided with nail-receiving grooves $g'$ and stops $g^4$ in line with the nail-receiving grooves 10 of the discharging device $b^4$. A link 27 of the form shown in Figs. 18 and 21 is secured at one end 26 to the arm $G^6$ of the discharging device and at its opposite end to an ear 28 of the reversing device $g^3$. When the machine is equipped with this mechanism, the nails are delivered from the discharging device $b^4$ onto the reversing device $g^3$, as shown in Figs. 17 and 19. When the discharging device $b^4$ is returned to its nail-receiving position, as heretofore described, it operates through the link 27 to tip the reversing device $g^3$ into the positions shown in Figs. 18 and 20, and thereby deliver the nails into the chutes point first, as shown. The connection of the reversing device $g^3$ to the discharging device $b^4$ by means of the link 27 insures that said reversing device $g^3$ shall be reciprocated with the frame $C^7$. This is important in that it causes the nails to be promptly discharged from the reversing device $g^3$ when it is turned into discharging position and prevents any nails from sticking in the grooves $g'$.

Having fully described our invention, what we claim as new, and desire to secure by Letters Patent, is—

1. In a nail-assorting mechanism, means for supplying nails, mechanism for delivering nails, a raceway to receive nails from the supplying means and guide them to the delivering mechanism, a returning-table, and means for reciprocating said raceway and table simultaneously in opposite directions to cause the nails to travel thereon.

2. In a nail-assorting mechanism, means for supplying nails, mechanism for delivering nails, a raceway for receiving nails from the supplying means and guiding them to the delivering mechanism, said raceway having provision for rejecting nails not properly lodged thereon; a second raceway for receiving and conveying the rejected nails; and means for reciprocating said raceways in opposite directions, to cause the nails to travel on said raceways.

3. In a nail-assorting mechanism, a raceway having grooves to receive and guide nails, mechanism for depositing nails upon said raceway, and a bridge interposed between said mechanism and the raceway to assist in distributing the nails uniformly upon the raceway, said bridge having a plurality of open spaces for the passage of the nails.

4. In a machine of the class described, a rotary magazine containing at one end a series of nail-lifting shelves and at the other end a series of obliquely-arranged blades to guide the nails toward the end of the magazine having the shelves.

5. In a machine of the class described, a magazine, and a frame to hold said magazine in operative position, said frame being also adapted to be tipped into position to sustain said magazine on its side so that it may be supplied with nails.

6. In a machine of the class described, a chute comprising a bar provided with a series of nail-passages, a second bar closing the open sides of said passages, and a series of tubes sustained by said bars in line with the nail-passages.

7. In a nail-assorting mechanism, a raceway comprising an upper section to receive nails with their heads and points arranged indiscriminately, a section arranged at a lower level to receive the nails from said upper section, and a nail-reverser located adjacent to the contiguous ends of said sections, and having grooves to receive the ends of the point-first nails and permit them to travel until their heads are unsupported, said grooves being extended and deflected to receive slivers or imperfect nails and discharge them from the lower end thereof.

8. In a machine of the class described, a raceway to receive and guide nails, means to reciprocate the raceway to cause the nails to travel thereon, mechanism for delivering a series of nails from the raceway, means to detain positively the series of nails next to the series being delivered, and means to suspend the reciprocations of the raceway while the detaining means is operative.

9. In a machine of the class described, a raceway for receiving and guiding nails, said raceway having provision for rejecting nails not properly lodged thereon, a returning-table for receiving and conveying the rejected nails, and a rotary magazine for supplying nails in bulk to the raceway and having an opening in one side to permit the return of nails to the magazine by the returning-table.

10. In a nail-assorting mechanism, a raceway to receive and guide nails, a device to discharge nails from the raceway, reversing means for causing the nails so discharged to point in the opposite direction, and mechanism for imparting to said reversing means a reciprocating movement to facilitate the delivery of nails therefrom.

In testimony whereof we have signed our names to this specification in the presence of two subscribing witnesses.

BENJAMIN F. MAYO.
ALVIN D. ELLIOTT.

Witnesses:
GEO. W. GREGORY,
MARGARET A. DUNN.